(12) United States Patent
Lagors

(10) Patent No.: US 9,783,051 B2
(45) Date of Patent: Oct. 10, 2017

(54) HYDROSTATIC TRANSMISSION SYSTEM OF A MOBILE MACHINE TRAVELING ON A SLOPE WITH A TILT

(71) Applicants: FLUID-SYSTEM, Lorette (FR); CNH INDUSTRIAL FRANCE, Morigny Champigny (FR)

(72) Inventor: Frédéric Lagors, Serpaize (FR)

(73) Assignees: CNH Industries France SAS, Lorette (FR); Fluid-System SARL, Lorrette (FR)

( * ) Notice: Subject to any disclaimer, the term of this patent is extended or adjusted under 35 U.S.C. 154(b) by 0 days.

(21) Appl. No.: 14/785,293

(22) PCT Filed: Apr. 16, 2014

(86) PCT No.: PCT/FR2014/050929
§ 371 (c)(1),
(2) Date: Oct. 16, 2015

(87) PCT Pub. No.: WO2014/170608
PCT Pub. Date: Oct. 23, 2014

(65) Prior Publication Data
US 2016/0107524 A1 Apr. 21, 2016

(30) Foreign Application Priority Data
Apr. 17, 2013 (FR) ...................................... 13 53471

(51) Int. Cl.
*F16H 61/40* (2010.01)
*B60K 17/356* (2006.01)
(Continued)

(52) U.S. Cl.
CPC ............ *B60K 17/356* (2013.01); *B60K 17/10* (2013.01); *F16H 59/66* (2013.01);
(Continued)

(58) Field of Classification Search
CPC .... F16H 59/66; F16H 61/4035; F16H 61/448; F16H 61/4008; B60K 17/10
See application file for complete search history.

(56) References Cited

U.S. PATENT DOCUMENTS 5,201,570 A 4/1993 Heren et al.
6,991,058 B2 1/2006 Cousin et al.
(Continued)

FOREIGN PATENT DOCUMENTS

DE 10255643 B3 4/2004
EP 0547947 A1 6/1993
(Continued)

OTHER PUBLICATIONS

Translation of FR2972146A1.*

*Primary Examiner* — Logan Kraft
*Assistant Examiner* — Abiy Teka
(74) *Attorney, Agent, or Firm* — Patrick M. Sheldrake

(57) ABSTRACT

A hydrostatic transmission device of a mobile machine having —at least one first motor and at least one second motor, —at least one first dual motor and at least one second dual motor each having first and second elementary motor, —the second elementary motor of the first dual motor is linked with the first motor by a serial duct, —the second elementary motor of the second dual motor is linked with the second motor by a serial duct, —each serial duct has a valve having an opening for passage of the fluid into the serial duct, said valve having a first position in which said opening has a maximum cross-section, and a second position in which said opening has a reduced cross-section, the movement of said valve between these two positions activated a control instruction generated when the machine is travelling on a slope.

15 Claims, 5 Drawing Sheets

(51) Int. Cl.
   *B60K 17/10*     (2006.01)
   *F16H 61/4008*   (2010.01)
   *F16H 61/4035*   (2010.01)
   *F16H 61/448*    (2010.01)
   *F16H 59/66*     (2006.01)

(52) U.S. Cl.
   CPC ..... *F16H 61/4008* (2013.01); *F16H 61/4035* (2013.01); *F16H 61/448* (2013.01); *B60W 2550/142* (2013.01); *F16H 2059/663* (2013.01)

(56) References Cited

U.S. PATENT DOCUMENTS

| | | |
|---|---|---|
| 8,671,674 B2 | 3/2014 | Prigent et al. |
| 2005/0031460 A1 | 2/2005 | Perry |

FOREIGN PATENT DOCUMENTS

| | | | | |
|---|---|---|---|---|
| FR | 2972146 A1 | * | 9/2012 | ......... F16H 61/4043 |
| JP | 11148146 A | * | 6/1999 | |

\* cited by examiner

HYDROSTATIC TRANSMISSION SYSTEM OF A MOBILE MACHINE TRAVELING ON A SLOPE WITH A TILT

This application is the US National Stage filing of International Application Serial No. PCT/FR2014/050929 filed on Apr. 16, 2014 which claims priority to French Application 13/53471 filed Apr. 17, 2013, each of which is incorporated herein by reference in its entirety.

TECHNICAL FIELD OF THE INVENTION

The invention relates to a hydrostatic transmission system of a mobile machine travelling on a slope with a tilt. Further subject matter of the invention is a method for controlling a hydrostatic pressure in a mobile machine travelling on a slope with a tilt.

The invention concerns in particular the technical field of hydrostatic transmission systems on mobile machines of civil engineering or agricultural plant type enabling control of the distribution of the torques in the front and rear wheels of said machines.

PRIOR ART

Referring to the appended FIG. 1, the hydrostatic transmission systems of a mobile machine generally comprise:
- at least one front-left wheel Ravg and one front-right wheel Ravd and at least one rear-left wheel Rarg and one rear-right wheel Rard;
- a pump P, driven by an (electric) motor or a (thermal) engine, the principal ports of which are respectively connected to a "reverse" high-pressure duct 1 (MAR) and a "forward" high-pressure duct 2 (MAV);
- at least one first "front-left" motor Mavg and at least one second "front-right" motor Mavd, these two motors respectively driving the front-left wheel Ravg and a front-right wheel Ravd, which wheels are mounted on a front axle;
- at least one first "rear-left" dual motor and at least one second "rear-right" dual motor; these two motors respectively drive the rear-left wheel Rard and a rear-right wheel Rard, which wheels are mounted on a rear axle;
- the dual motors each consist of a first elementary motor Mar1g, Mar1d and a second elementary motor Mar2d, Mar2g, each of the two elementary motors Mar1g-Mar2g and Mar1d-Mar2d having separate supply ports;
- the first elementary motors Mar1g-Mar1d, the first "front-left" motor Mavg and the second "front-right" motor Mavd are connected in parallel to the "forward" high-pressure duct 2;
- the first elementary motors Mar1g-Mar1d and the second elementary motors Mar2d-Mar2g are connected in parallel to the "reverse" high-pressure duct 1,
- the second elementary motor Mar2g of the first "rear-left" dual motor is connected in series with the first "front-left" motor Mavg, there being a series duct 3g between these two motors,
- the second elementary motor Mar2d of the second "rear-right" dual motor is connected in series with the second "front-right2 motor Mavd, there being a series duct 3d between these two motors.

This type of system, well-known to the person skilled in the art, constitutes a closed transmission circuit. It is usually described as half-parallel/half-series and makes it possible on the one hand to obtain synchronisation of the wheels thanks to the series connections and on the other hand to obtain equal output torques thanks to the parallel connections. Such systems are described in the following patent documents, for example: FR 2.828.544 (POCLAIN), FR 2.913.218 (POCLAIN), EP 0.547.947 (POCLAIN) and FR 2.972.146 (FLUID SYSTEM).

Experience and theory show that when the machine equipped with such a transmission is travelling forward, in terrain with a slope with a tilt, the rear axle tends to drift in the direction of said tilt, thus creating a misalignment of the rear wheels Rarg, Rard with the front wheels Ravg, Ravd. This drifting of the machine is caused by a transfer of braking torque to the front wheel that is higher on the tilt, combined with lateral sliding of the tyre. The poor distribution of braking on the machine relative to the relief and to the grip of the terrain implies that the rear axle skids in the direction of the tilt. This excess transfer of the braking torque finds its explanation in the very architecture of the half-parallel/half-series transmission, and is explained next with reference to the example shown diagrammatically in FIG. 2.

In FIG. 2, the thick continuous lines represent the ducts in which the fluid circulates at high pressure. The thick dashed lines represent the ducts in which the fluid circulates at an intermediate pressure. The thin chain-dotted lines represent the ducts in which the fluid circulates without being pressurised. All of these ducts form a closed hydrostatic transmission circuit. The arrow by the pump P indicates the direction of the flow. In this example, the direction SA of forward movement of the machine is toward the front (forward); the pump P discharges into the "front" high-pressure duct 2 (MAV). The slope PE is parallel to the direction SA of forward movement, the rear axle being higher than the front axle. The working pressure is transferred into the "reverse" high-pressure duct 1. This inversion of pressure in the high-pressure ducts 1 and 2 occurs because the machine is driven by its weight. The motors become "pumps" driven by the machine whereas the pump P becomes a "motor" and must brake the machine by creating a resisting torque. The tilt DE is to the right, i.e. the right-hand wheels Ravd-Rard are lower than the left-hand wheels Ravg-Rarg.

In this configuration, and by virtue of the design of the transmission system, with the dual-cylinder motors positioned on the rear axle, the rear wheels Rarg-Rard retain the machine when the latter is travelling forward and downward on terrain with a slope. The machine is driven by its weight and, on the rear axle, the rear wheel that is lower in the tilt is the more loaded. This wheel defines the pressure conditions at the ports of the motors on the parallel branches of the circuit. In the FIG. 2 example, the rear-right wheel Rard is the most loaded wheel. The braking torque developed at this wheel Rard is proportional to the pressure difference $\Delta Pa11d-b21d$ at the ports of the first elementary motor Mar1d of the "rear-right" dual motor. This pressure difference is duplicated in the parallel branch of the circuit, and notably at the ports of the first elementary motor Mar1g of the "rear-left" dual motor:

$$\Delta Pa11g-b21g = \Delta Pa11d-b21d$$

This pressure difference $\Delta Pa11g-b21g$ generates a braking torque that is too high relative to the load and grip conditions of the rear-left wheel Rarg. In fact, because of the tilt DE this wheel is less loaded than the rear-right wheel Rard. In fact, to adapt to the load and grip conditions for the rear-left wheel Rarg, the second series elementary motor Mar2g of the "rear-left" dual motor must reduce the total torque by creating a torque opposite that of the first elementary motor Mar1g. This action of the second elementary motor Mar2g generates a rise in pressure of the fluid in the left-hand series duct 3g: Pb22g>>Pb21g. This rise in pressure in the series duct 3g generates an increase in the braking torque at the front-left wheel Ravg. In fact, because Pa2g=Pb21d and Pb2g>Pa11d, then:

$$\Delta Pa2g-b2g > \Delta Pb21d-a11d.$$

The braking torque on the front-left wheel Ravg becomes higher than the braking torque on the rear-right wheel Rard. This transfer of the braking torque to the front-left wheel Ravg implies that the rear axle skids in the direction of the tilt DE.

By way of example, the pressures P at the various points of the circuit shown in FIG. 2 may be as follows:
Pb21d=Pb21g=Pa2d=Pa2g=35 bar
Pa11g=Pb12g=Pa12d=Pa11d=275 bar
Pb2d=Pb22d=250 bar (in the right-hand series duct 3d, situated on the lower side in the tilt).
Pb2g=Pb22g=400 bar (in the left-hand series duct 3g, situated on the higher side in the tilt).

None of the patent documents cited above addresses an adjustment of the pressure conditioned by the machine travelling on a slope with a tilt.

Faced with this situation, the principal objective of the invention is to propose a hydrostatic transmission system eliminating the drawbacks cited above.

To be more specific, an objective of the invention is to propose a transmission system enabling the machine to travel on a slope with a tilt without any of its axles skidding.

Another objective of the invention is to limit or even to eliminate all transfer of the braking torque to one of the wheels of the machine.

STATEMENT OF THE INVENTION

The solution proposed by the invention is a hydrostatic transmission system of a mobile machine of the type described above with reference to the FIGS. 1 and 2 cited above in which each series duct 3g, 3d includes a valve having an opening for the passage of the fluid into the series duct, said valve having a position in which said opening has a maximum section and another position in which said opening has a smaller section, the movement of said valve between these two positions being activated in response to a control instruction that is generated when the mobile machine is travelling on a slope with a tilt.

Accordingly, if the pressure in one of the series ducts rises excessively, the valve is activated. In the example cited above, the valve makes it possible to reduce the pressure in the left-hand series duct so as to reduce the braking torque on the front-left wheel Ravg relative to the braking torque on the rear-right wheel Rard. The trajectory of the machine is therefore corrected, the latter moving in a straight line without the rear axle skidding.

Other advantageous features of the system that is the subject matter of the invention are listed below, each of these features being considered alone or in combination with the features defined above:
the control instruction is assigned to the valve that is placed in the series duct situated on the lower side in the tilt.
these valves may be configured to be placed in the second position in response to a control instruction generated manually from a control unit installed in a control cabin of the machine or generated automatically from a control unit controlled by a slope and tilt sensor.
the movement of the valves between the two positions is controlled as a function of the pressure difference:
on the one hand in the more loaded series duct of the system,
on the other hand, in the series duct in which said valve is installed.
a pressure selector may be connected to the two series ducts, which selector is configured to control the movement of the valves as a function of the pressure in the more loaded series duct.
the valves are advantageously subjected automatically to the pressure of the more loaded series duct in response to a control instruction generated manually from a control unit installed in a control cabin of the machine or generated automatically from a control unit controlled by a slope and tilt sensor.
in another variant embodiment, the movement of the valve between the active position and the inactive position is controlled as a function of the pressure in the more loaded series duct of the system.
the series ducts may be associated with pressure sensors transmitting pressure signals to an electronic control card, which card is configured to generate control instructions for the valves so as to move them between the two positions, which instructions are a function of the pressure in the more loaded series duct and the pressure in the series duct in which each valve is installed.
the electronic control card is preferably activated by a slope and tilt sensor.

Another aspect of the invention concerns a method for controlling a hydrostatic pressure of a mobile machine travelling on a slope with a tilt, said method consisting in:
pressurising a fluid in a "reverse" high-pressure duct and in a "forward" high-pressure duct,
causing the fluid to circulate to: at least one first "front-left" motor, at least one second "front-right" motor, at least one first "rear-left" dual motor and at least one second "rear-right" dual motor, which dual motors each consist of a first elementary motor and a second elementary motor,
connecting in parallel to the "forward" high-pressure duct the first elementary motors, the first "front-left" motor and the second "front-right" motor,
connecting in parallel to the "reverse" high-pressure duct the first elementary motors and the second elementary motors,
connecting in series the second elementary motor of the first "rear-left" dual motor and the first "front-left" motor via a series duct,
connecting in series the second elementary motor of the second "rear-right" dual motor and the second "front-right" motor via a series duct,
adjusting the pressure in at least one of the series duct when the mobile machine is travelling on a slope with a tilt, and more particularly reducing the pressure in the series duct that is situated on the lower side in the tilt. This adjustment of the pressure is preferably carried out by activating a valve installed in the series duct in response to a control instruction that is generated when the mobile machine is travelling on the slope with a tilt.

A further aspect of the invention concerns a method for controlling the trajectory of mobile machine travelling on a slope with a tilt, said method consisting in:

pressurising a fluid in a "reverse" high-pressure duct and in a "forward" high-pressure duct, causing the fluid to circulate to: at least one first "front-left" motor, at least one second "front-right" motor, at least one first "rear-left" dual motor and at least one second "rear-right" dual motor, which dual motors each consist of a first elementary motor and a second elementary motor, connecting in parallel to the "forward" high-pressure duct the first elementary motors, the first "front-left" motor and the second "front-right" motor, connecting in parallel to the "reverse" high-pressure duct the first elementary motors and the second elementary motors, connecting in series the second elementary motor of the first "rear-left" dual motor and the first "front-left" motor via a series duct, connecting in series the second elementary motor of the second "rear-right" dual motor and the second "front-right" motor via a series duct, adjusting the pressure in at least one of the series duct when the mobile machine is travelling on a slope with a tilt, and more particularly reducing the pressure in the series duct that is situated on the lower side in the tilt so as to adjust the the braking torques on the different motors. This adjustment of the pressure is preferably carried out by activating a valve installed in the series duct in response to a control instruction that is generated when the mobile machine is travelling on the slope with a tilt.

DESCRIPTION OF THE FIGURES

Other advantages and features of the invention emerge more clearly from a reading of the following description of a preferred embodiment with reference to the appended drawings, produced by way of illustrative and non-limiting example and in which.

the aforementioned

PREFERRED EMBODIMENTS OF THE INVENTION

The hydrostatic transmission system that constitutes the subject matter of the invention is particularly intended to be used in a mobile machine of civil engineering plant or tractor type. It is particularly suitable for agricultural vehicles with four-wheel drive of fixed or variable cubic capacity, of the type used in vineyards and where the cultivated terrain is liable to be rough (steep slopes, slippery terrain).

In the context of the present invention, elements of the hydrostatic transmission system are "connected" to one another in the sense that the fluid can circulate from one element to another via one or more ducts.

Figure 1:
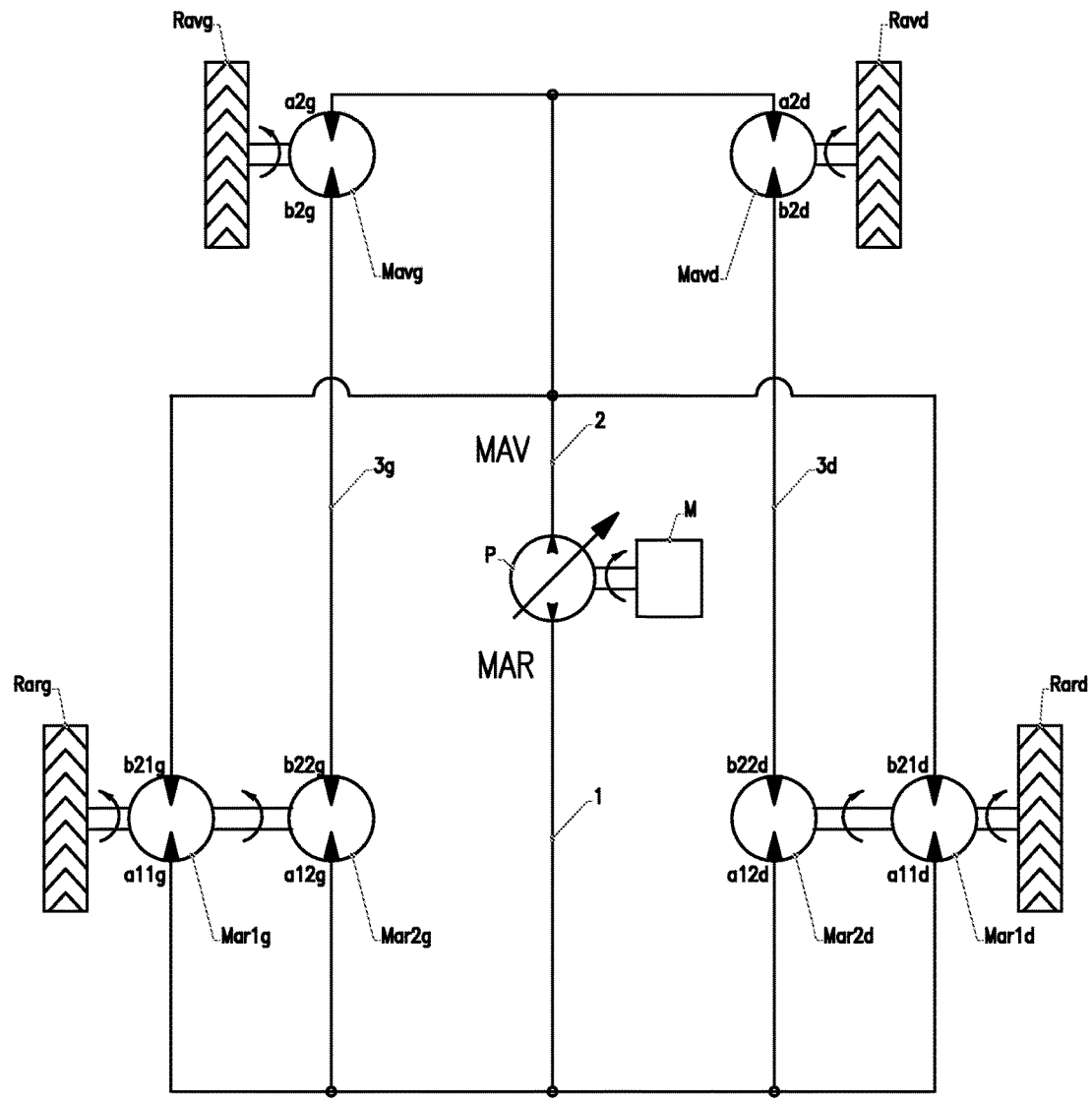
FIG. 1 is a diagrammatic view of a prior art hydrostatic transmission system, the aforementioned
Figure 2:
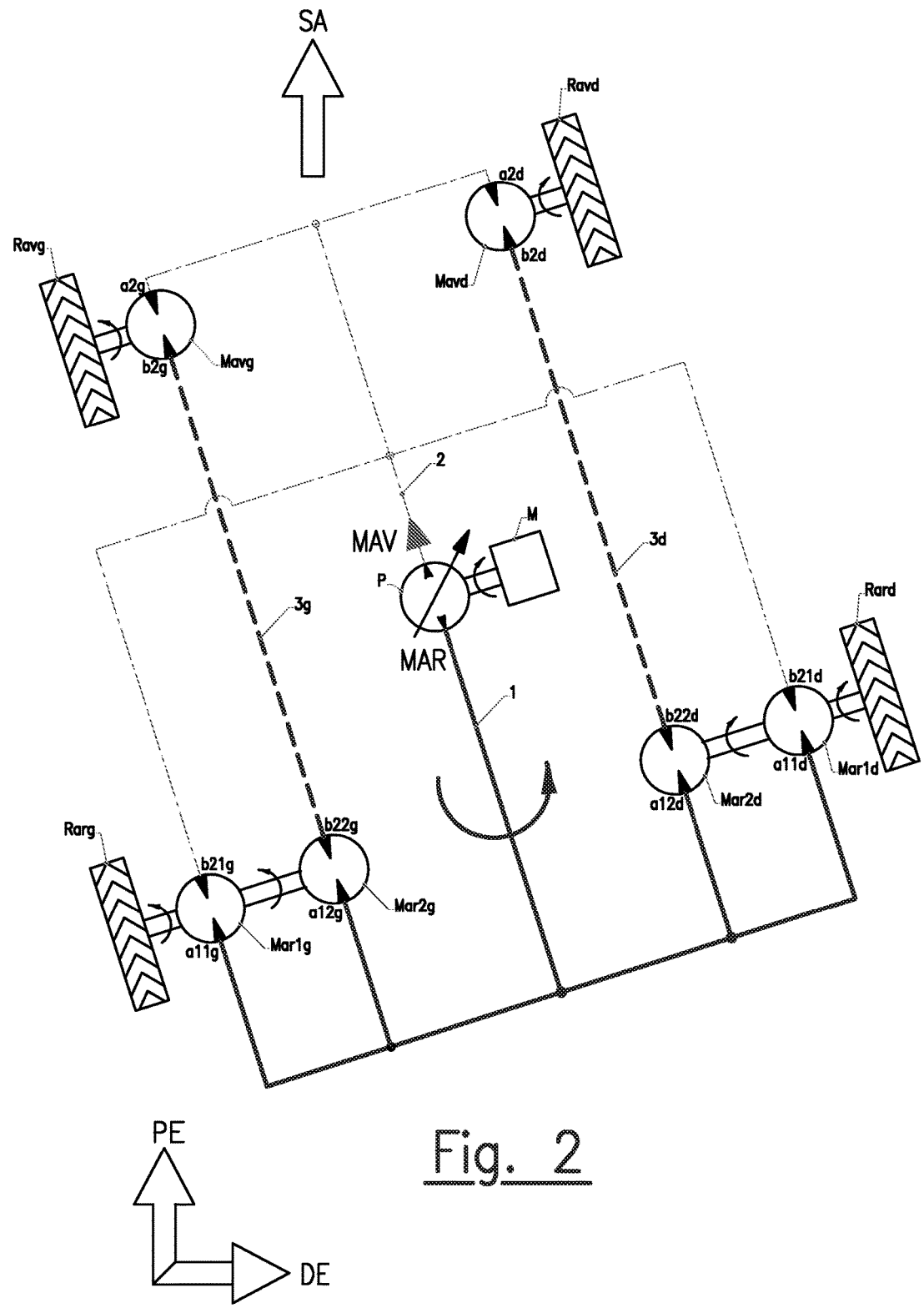
FIG. 2 shows the hydrostatic transmission system from FIG. 1 when the machine is travelling on a slope with a tilt.

As described above with reference to FIGS. 1 and 2, the hydrostatic transmission system includes at least one front-left wheel Ravg and one front-right wheel Ravd (and more generally a front group of movement members), and at least one rear-left wheel Rarg and one rear-right wheel Rard (and more generally, a rear group of movement members). At least one "front" motor and one "rear" motor respectively contribute to driving the front wheels Ravg, Ravd and the rear wheels Rarg, Rard.

Figure 3:
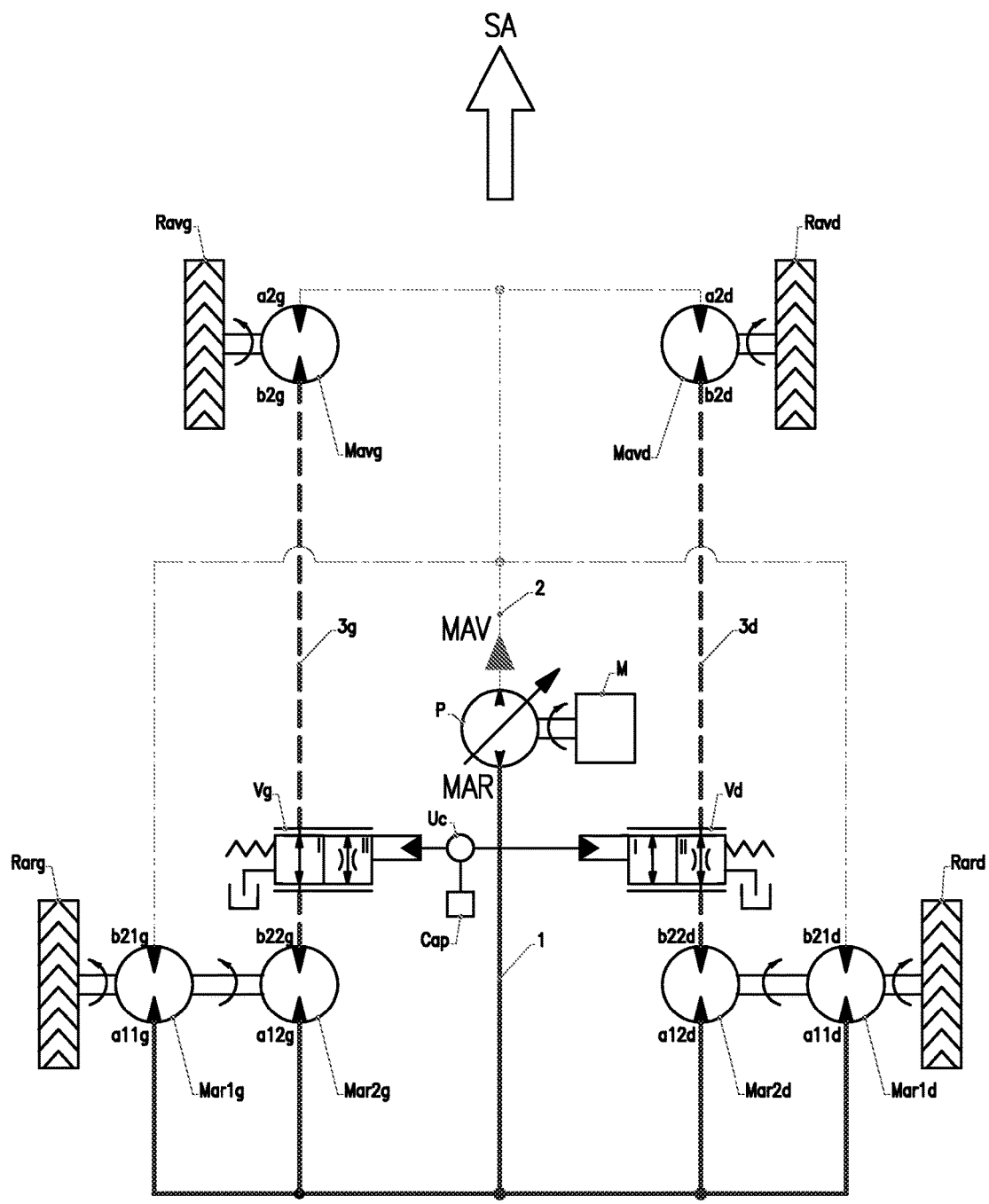
FIG. 3 is a diagrammatic view of a hydrostatic transmission system conforming to a first embodiment of the invention.
Figure 4:
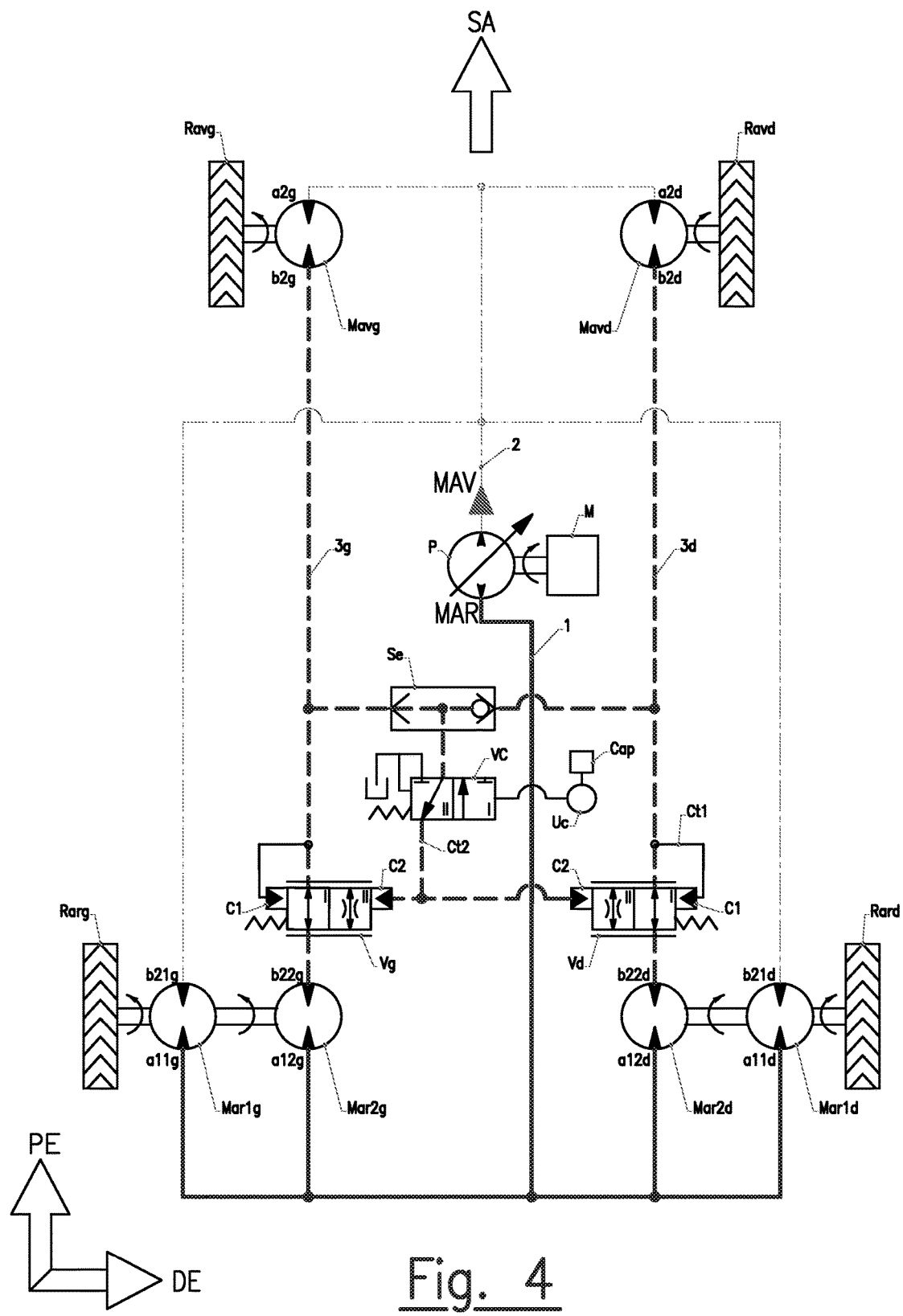
FIG. 4 is a diagrammatic view of a first variant of a hydrostatic transmission system conforming to a second embodiment of the invention.
Figure 5:
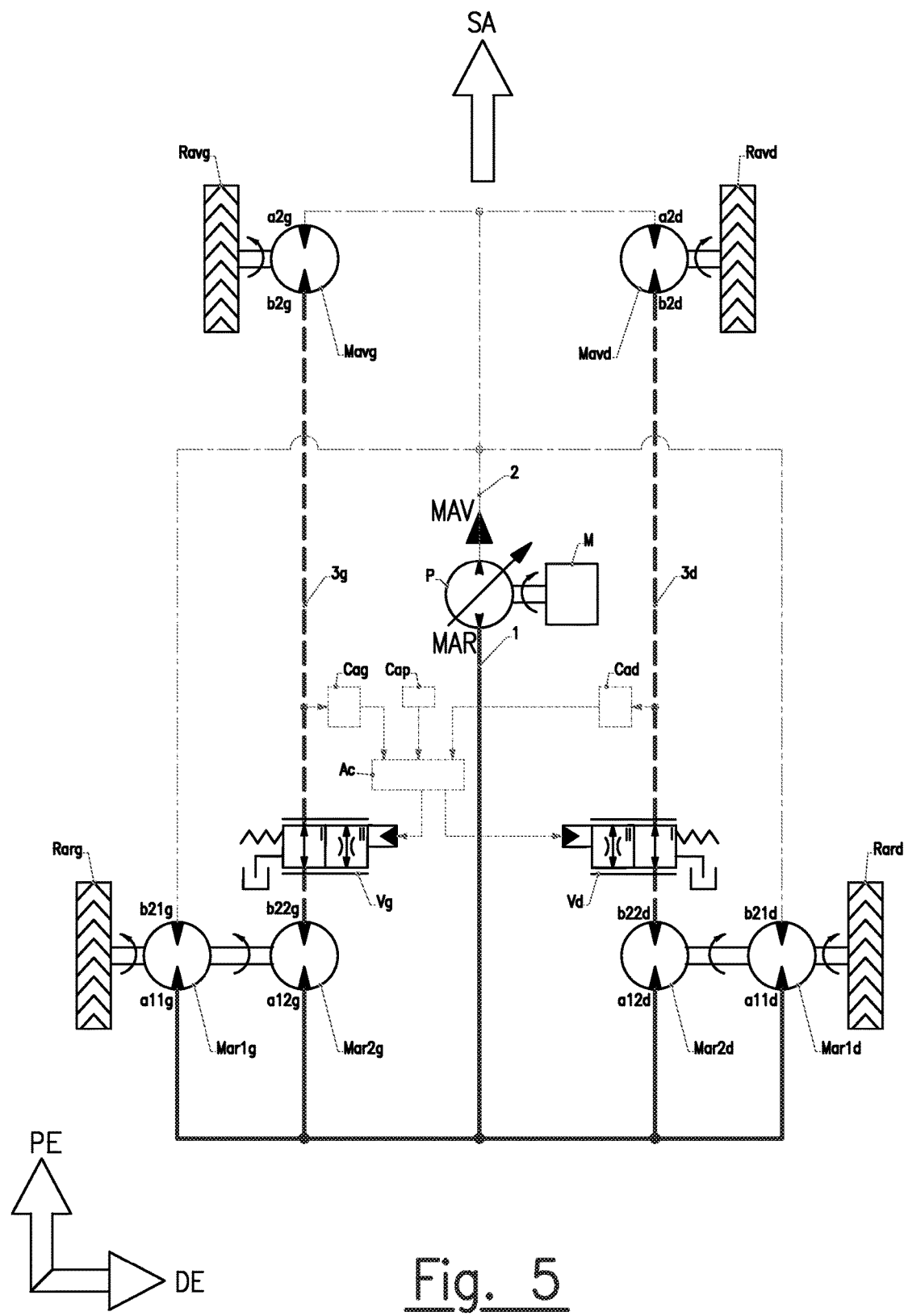
FIG. 5 is a diagrammatic view of a second variant of a hydrostatic transmission system conforming to the second embodiment of the invention.

In the appended FIGS. 3 to 5, the "front" right motor Mavd and "front" left motor Mavg, are single motors, i.e. consist of a single elementary motor. The "rear" motors are dual motors, i.e. each consisting of two elementary motors Mar1g-Mar2g and Mar1d-Mar2d, each having separate inlet and/or outlet ports.

The invention is not limited to this configuration, however, and the "front" motors Mavd, Mavg can be dual motors (or triple, etc. motors) and the "rear" motors Mar1g-Mar2g, Mar1d-Mar2d, motors with more than two cubic capacities. Each elementary motor may furthermore be associated with its own movement member.

The system also includes a hydraulic pump P, the principal ports of which are connected to a "reverse" high-pressure duct 1 (MAR) and a "forward" high-pressure duct 2 (MAV). By "high-pressure duct" is meant a duct in which a fluid is intended to circulate at a high pressure (for example approximately 500 bar), whether the fluid circulates in said duct or not.

The pump P discharges into the "reverse" high-pressure duct 1 (MAR) when the machine is travelling backwards and discharges into the "forward" high-pressure duct 2 (MAV) when the machine is travelling forward.

The first elementary motors Mar1g-Mar1d, the first "front-left" motor Mavg and the second "front-right" motor Mavd are connected in parallel to the "forward" high-pressure duct 2. Each of these motors Mar1g, Mar1d, Mavg, Mavd therefore has a respective port b21g, b21d, a2g, a2d connected to the "forward" high-pressure duct 2.

The first elementary motors Mar1g-Mar1d and the second elementary motors Mar2d-Mar2g are connected in parallel to the "reverse" high-pressure duct 1. Each of these motors Mar1g, Mar1d, Mar2d, Mar2g therefore has a respective port a11g, a11d, a12d, a12g connected to the "reverse" high-pressure duct 1.

The second elementary motor Mar2g of the first "rear-left" double motor is connected in series with the first "front-left" motor Mavg, there being a left-hand series duct 3g between these two motors. Each of these motors Mar2g, Mavg therefore has a respective port b22g, b2g connected to the series duct 3g.

The second elementary motor Mar2d of the second "rear-right" double motor is connected in series with the second "front-right" motor Mavd, there being a right-hand series duct 3d between these two motors. Each of these motors Mar2d, Mavd therefore has a respective port b22d, b2d connected to the series duct 3d.

A half-parallel/half-series transmission closed circuit is therefore obtained.

In accordance with the invention, to prevent the pressure in the series ducts 3g, 3d rising when the machine is travelling on a slope with a tilt, each of said ducts is provided with a valve Vg, Vd adapted to be activated to control the pressure in the series duct with which it is associated. These valves Vg, Vd are activated in response to a control instruction that is generated when the mobile machine is travelling on a slope with a tilt. Two embodiments are described next.

First Embodiment: Torque Transfer

A first embodiment of the invention is described with reference to FIG. 3. In this embodiment, the valves Vg, Vd are 2-way/2-position torque transfer valves. Each valve Vg, Vd has an progressively adjustable opening for the passage of the fluid into the series duct 3g, 3d with which it is associated. In a first position I, this opening has a maximum section. In a second position II, this opening has a smaller section so that a head loss is created in the series duct 3g, 3d. At rest, i.e. in the absence of any loading, a return spring automatically returns the valve Vg, Vd to the first position I.

A control instruction makes it possible to go from the position I to the position II. This control instruction may be generated manually from a control unit installed in a control cabin of the machine. For example, this may be a pushbutton switch actuated by the driver of the machine when the latter is travelling on a slope with a tilt.

In the preferred embodiment shown in FIG. 3, the control instruction is generated automatically from a control unit Uc controlled by a slope and tilt sensor Cap. The control unit Uc takes the form of an electronic circuit board, for example, including one or more processors and other electronic components for generating the control instruction. The sensor Cap is for example a sensor for generating an electrical signal to go to the unit Uc as soon as the machine is travelling on a slope having a certain inclination (e.g. 3%) and a certain tilt (e.g. 6%). The instruction generated by the unit Uc may be proportional to the inclinations of the slope and the tilt, so that the section of the port of the valve Vg, Vd concerned is proportional these measured inclinations.

Progressively adjusting the port section of the valves Vg, Vd creates a progressive head loss on the series duct 3g, 3d on which they are mounted. This reduces the inlet pressure of the elementary motors Mar2g, Mar2d.

The control instruction for going from the position I to the position II is assigned to the valve Vg, Vd that is placed in the series duct 3g, 3d situated on the lower side in the tilt. In the example shown in FIG. 3, the right-hand valve Vd is activated. The pressure in the portion of the series duct 3d situated between Pb22d at the inlet of the elementary motor Mar2d is reduced and the pressure difference at the ports of the elementary motor Mar2d increases. The braking torque on the rear-right wheel Rard is therefore better balanced in order to correct the trajectory of the machine. In fact, by giving preference to braking the series motor Mar2d, the parallel motor Mar1d does not need to develop as high a braking torque as that developed in the FIG. 2 example. The pressure difference $\Delta Pa11d-b21d$ at the ports of the motor Mar1d is limited, this pressure difference being copied to the parallel branch of the circuit, and notably to the ports of the motor Mar1g ($\Delta Pa11g-21g=\Delta Pa11d-b21d$). This pressure difference $\Delta Pa11g-21g$ generates a braking torque that is more appropriate given the load and grip conditions of the rear-left wheel Rarg so that the second motor Mar2g no longer needs to compensate the total torque on this wheel so much. The rise in pressure of the fluid in the left-hand series duct 3g is therefore limited as is the braking torque on the front-left wheel Ravg. It is even possible to observe a pressure drop in this series duct. In contrast to the phenomenon explained with reference to FIG. 2, the transfer of the braking torque to the front-left wheel Ravg is therefore limited, or even eliminated: the trajectory of the machine is corrected.

By way of illustration, the pressures P at the various points of the circuit shown in FIG. 3 (under the same conditions as in FIG. 2) may be as follows:

Pb21d=Pb21g=Pa2d=Pa2g=35 bar

Pa11g=Pb12g=Pa12d=Pa11d=200 bar

Pb2d=275 bar (in the portion of the right-hand series duct 3d situated on the lower side in the tilt between the valve Vd and the motor Mavd).

Pb22d=60 bar (in the portion of the right-hand series duct 3d situated on the lower side in the tilt between the valve Vd and the motor Mar2d).

Pb2g=Pb22g=225 bar (in the left-hand series duct 3g situated on the higher side in the tilt).

Second Embodiment: Torque Distribution

A second embodiment of the invention is described next with reference to FIGS. 4 and 5. In this embodiment, the valves Vg, Vd are torque distribution valves. Each valve Vg, Vd has a progressively adjustable opening for the passage of the fluid into the series duct 3g, 3d with which it is associated. In a first position I, this opening has a maximum section. In a second position II, this opening has a smaller section so that a head loss is created in the series duct 3g, 3d. At rest, i.e. in the absence of any loading, a return spring automatically returns the valve Vg, Vd to the first position I. This return spring is set to a relatively low value, for example 2-3 bar, so as not to interfere with the torque distribution process described hereinafter.

The movement of the valves Vg, Vd between the two positions I, II is controlled as a function of the pressure difference:

on the one hand in the more loaded series duct 3g, 3d of the system, on the other hand in the series duct 3g, 3d in which said valve is installed.

The objective is for the pressures in the series ducts 3g, 3d to balance at a mean value enabling a quasi-uniform transfer of the braking torques to the four wheels Ravg, Ravd, Rarg, Rard.

The valves Vg, Vd therefore limit the pressure rise in the series duct 3g, 3d on the higher side in the tilt so that the drift phenomenon disappears.

Two variants of this second embodiment are described next.

First Variant

In accordance with a first variant shown in FIG. 4, in each valve Vg, Vd, a drawer type mobile member makes it possible to go from one position to the other. This mobile member is controlled by control means. In a manner that is well-known to the person skilled in the art, the latter means advantageously take the form of hydraulic control chambers for controlling the valves Vg, Vd.

A first control member C1 is connected to the series duct to which the valve Vg, Vd is connected in the portion between said valve and the front motor Mavg, Mavd via a duct Ct1. A second control member C2 is connected to a selector Se via a duct Ct2, which selector is connected on the one hand to the right-hand series duct 3d and on the other hand to the left-hand series duct 3g. The connection of the selector Se to the series ducts is made in the port of said ducts between the valves Vg, Vd and the front motors Mavg, Mavd. The selector Se enables connection of the duct Ct2, and therefore of the second control members C2, to the more loaded series duct 3g, 3d. Each valve Vg, Vd is therefore controlled as a function of the pressure difference on the one hand in the more loaded series duct 3g, 3d of the system and on the other hand in the series duct 3g, 3d in which said valve is installed.

A control valve VC is installed in the duct Ct2. This valve VC has: —a first position I in which it isolates the duct Ct2 from the selector Se (and therefore from the series ducts 3g, 3d), and—a second position II in which it establishes communication between the duct Ct2 and the selector Se (and therefore with the series ducts 3g, 3d). A control instruction makes it possible to go from the position I to the position II. This control instruction may be generated manually from a control unit installed in a control cabin of the machine. This may for example be a pushbutton switch actuated by the driver of the machine when the latter is travelling on a slope with a tilt. In accordance with the preferred embodiment shown in FIG. 4, the control instruction is generated automatically from a control unit Uc controlled by a slope and tilt sensor Cap, these elements being similar to those described above with reference to FIG. 3. The valves Vg, Vd are therefore automatically subjected to the pressure of the more loaded series duct 3g, 3d in response to this control instruction generated manually or automatically.

The operation of this system is described for the same conditions of forward movement, slope and tilt as referred to above. The control valve VC is actuated so that it is placed in the position II: the valves Vg, Vd are connected to the selector Se. The pressure in the left-hand series duct 3g increases so that it becomes the more loaded series duct. The left-hand valve Vg that is mounted in this series duct 3g remains in the position I because the pressures to which it is subjected balance (Pc1=Pc2). The right-hand valve Vd mounted in the right-hand series duct 3d moves into the position II (Pc1<Pc2). Until the pressure in the right-hand series duct 3d reaches the value of the pressure in the left-hand series duct 3g, the right-hand valve 3d remains in this second position II until an equilibrium position is reached in which the pressures in the right-hand series duct 3d and the left-hand series duct 3g balance. This equilibrium enables a quasi-uniform transfer of the braking torques to the four wheels Ravg, Ravd, Rarg, Rard, and therefore limits an excessive pressure rise on the series duct 3g that is on the higher side in the tilt: the trajectory of the machine is corrected.

By way of illustration, the pressures P at the various points of the circuit shown in FIG. 4 (under the same conditions as for FIG. 2) may be as follows:
Pb21d=Pb21g=Pa2d=Pa2g=35 bar
Pa11g=Pa12g=Pa12d=Pa11d=200 bar
Pb2d=Pb2g=Pb22g=275 bar
Pb22d=60 bar Second Variant A second variant is shown in FIG. 5. In this variant, the purely hydraulic control of the first variant is replaced by electro-hydraulic control.

The control instruction enabling the valves Vg, Vd to go from the position I to the position II is now generated automatically from an electronic control card Ac, for example of PID type, and carrying one or more processors and other electronic components. This card Ac receives information generated by pressure sensors Cag, Cad associated with the series ducts 3g, 3d. These pressure sensors Cag, Cad therefore transmit pressure signals to the card Ac. In the FIG. 3 example, the pressure sensors Cag, Cad are installed in the portion of the series ducts 3g, 3d between the valves Vg, Vd and the front motors Mavg, Mavd.

In the same way as described above, the control instructions generated by the card Ac are a function of the pressure in the more loaded series duct 3g, 3d and the pressure in said series duct in which each valve is installed (the left-hand series duct 3g for the left-hand valve Vg and the right-hand series duct 3d for the right-hand valve Vd).

The card Ac is preferably activated by a slope and tilt sensor Cap. The latter is of the type described above, and makes it possible to generate an activation electrical signal intended for the card Ac when the machine is travelling on a slope having a certain inclination and a certain tilt. As soon as it receives this activation signal, the card Ac generates the control instructions so that the pressures in the series ducts 3g, 3d balance at a mean value, preventing an excessive pressure rise on the series duct 3g on the higher side in the tilt.

The systems that have just been described make it possible to correct the trajectory of a machine moving forward on a slope with a tilt to the right. The invention is not limited to these parameters, however. If the tilt is to the left, it is obvious that control will be effected on the left-hand series duct. Similarly, if the machine is travelling backwards on a slope with a tilt, the same principle of transfer or distribution of torque will be applied, the information obtained on the pressure in the series ducts 3g, 3d will still relate to the portion between the valves Vg, Vd and the rear motors Mar2g, Mar2d.

The arrangement of the various elements and/or means and/or steps of the embodiments of the invention described above must not be understood as requiring such an arrangement in all the embodiments. In any event, it is clear that diverse modifications may be made to these elements and/or means and/or steps without departing from the spirit and the scope of the invention.

The invention claimed is:

1. A hydrostatic transmission system of a mobile machine comprising:
    a pump the principal ports of which are respectively connected to a first high-pressure duct and a second high-pressure duct,
    at least one first motor and at least one second motor,
    at least one first dual motor and at least one second dual motor, which dual motors each comprise a first elementary motor and a second elementary motor,
    the first elementary motors, the first motor and the second motor are connected in parallel to the first high-pressure duct,
    the first elementary motors and the second elementary motors are connected in parallel to the second high-pressure duct,
    the second elementary motor of the first dual motor is connected in series with the first motor, there being a first series duct between these two motors,
    the second elementary motor of the second dual motor is connected in series with the second motor, there being a second series duct between these two motors,
    wherein each of the first and second series duct includes a valve having an opening for the passage of the fluid into through the respective series duct, said valve having a first position in which said opening has a maximum flow section and a second position in which said opening has a smaller flow section, the movement of said valve between these two positions being activated in response to a control instruction that is generated when the mobile machine is travelling on a slope with a tilt; wherein an inlet and an outlet of each valve is directly connected to only the respective series duct.

2. A system according to claim 1, wherein the control instruction is assigned to the valve that is placed in the one of the first and second series duct situated on the lower side in the tilt.

3. A system according to claim 1, wherein the valves are configured to be placed in the second position in response to a control instruction generated manually from a control unit installed in a control cabin of the machine.

4. A system according to claim 1, wherein the valves are configured to be placed in the second position in response to a control instruction generated automatically from a control unit controlled by a slope and tilt sensor.

5. A system according to claim 1, wherein the movement of the valves between the two positions is controlled as a function of at least one of a pressure difference:
- in the more pressure loaded series duct of the first and second series ducts of the system, and
- in the one of the series ducts in which said valve is installed.

6. A system according to claim 5, wherein a pressure selector is connected to the first and second series ducts, which selector is configured to control the movement of the valves as a function of the pressure in the more loaded duct of the first and second series ducts.

7. A system according to claim 5, wherein the valves are automatically subjected to the pressure of the more loaded series duct of the first and second series ducts in response to a control instruction generated manually from a control unit installed in a control cabin of the machine.

8. A system according to claim 5, wherein the valves are automatically subjected to the pressure of the more loaded series duct of the first and second series duct in response to a control instruction generated automatically from a control unit controlled by a slope and tilt sensor.

9. A system according to claim 5, wherein the series ducts are associated with pressure sensors transmitting pressure signals to an electronic control card, which card is configured to generate control instructions for the valves so as to move them between the two positions, which instructions are a function of the pressure in the more loaded series duct of the first and second series duct and the pressure in the respective series duct in which each valve is installed.

10. A system according to claim 9, wherein the electronic control card is activated by a slope and tilt sensor.

11. A method for controlling a hydrostatic pressure of a mobile machine travelling on a slope with a tilt, said method comprising:
- pressurising a fluid in a first high-pressure duct and in a second high-pressure duct,
- causing the fluid to circulate to: at least one first motor, at least one second motor, at least one first dual motor and at least one second dual motor, which dual motors each comprising a first elementary motor and a second elementary motor,
- connecting in parallel to the high-pressure duct the first elementary motors, the first motor and the second motor,
- connecting in parallel to the high-pressure duct the first elementary motors and the second elementary motors,
- connecting in series the second elementary motor of the first dual motor and the first motor via a first series duct,
- connecting in series the second elementary motor of the second dual motor and the second motor via a second series duct,
- adjusting the pressure in at least one series duct of the first and second series ducts by varying a flow section therein when the mobile machine is travelling on a slope with a tilt; varying a flow of fluid through the series ducts by using a valve placed on each series duct that has its inlet and outlet directly connected to only the respective series duct.

12. A method according to claim 11, wherein the pressure is adjusted by activating the valve installed in at least one of the first and second series ducts in response to a control instruction that is generated when the mobile machine is travelling on a slope with a tilt.

13. A method according to claim 11, further comprising reducing the pressure in the series duct that is situated on the lower side in the tilt.

14. A method for controlling the trajectory of mobile machine travelling on a slope with a tilt, said method comprising:
- pressurising a fluid in a first high-pressure duct and in a second high-pressure duct,
- causing the fluid to circulate to: at least one first motor, at least one second motor, at least one first dual motor and at least one second dual motor, which dual motors each comprise a first elementary motor and a second elementary motor,
- connecting in parallel to the high-pressure duct the first elementary motors, the first motor and the second motor,
- connecting in parallel to the high-pressure duct the first elementary motors and the second elementary motors,
- connecting in series the second elementary motor of the first dual motor and the first motor via a first series duct,
- connecting in series the second elementary motor of the second dual motor and the second motor via a second series duct,
- adjusting the pressure in the series duct of the first and second series duct that is situated on the lower side in the tilt by varying a flow section therein so as to reduce the braking torques on the different motors; varying a flow of fluid through the series ducts by using a valve placed on each series duct that has its inlet and outlet directly connected to only the respective series duct.

15. A method according to claim 14, wherein the pressure is adjusted by activating the valve installed in the series duct in response to a control instruction that is generated when the mobile machine is travelling on a slope with a tilt.

* * * * *